United States Patent

Shimoji et al.

[11] 3,905,337
[45] Sept. 16, 1975

[54] FUEL INJECTION TYPE ROTARY PISTON ENGINE

[75] Inventors: Masaharu Shimoji; Haruhiko Satou, both of Hiroshima, Japan

[73] Assignee: Toyo Kogyo Co., Ltd., Hiroshima, Japan

[22] Filed: July 15, 1974

[21] Appl. No.: 488,488

[30] Foreign Application Priority Data
July 16, 1973 Japan.............................. 48-86854

[52] U.S. Cl.............................. 123/8.09; 123/8.13
[51] Int. Cl.² ....................................... F02B 53/10
[58] Field of Search................. 123/8.09, 8.11, 8.13

[56] References Cited
UNITED STATES PATENTS

| 3,347,213 | 10/1967 | Froede............................. 123/8.45 |
| 3,412,716 | 11/1968 | Tausch et al. ..................... 123/8.13 |
| 3,476,092 | 11/1969 | Yamamoto ........................ 123/8.13 |
| 3,514,235 | 5/1970 | Yamauchi.......................... 123/8.45 |

Primary Examiner—William L. Freeh
Assistant Examiner—O. T. Sessions
Attorney, Agent, or Firm—Bucknam and Archer

[57] ABSTRACT

Fuel injection type rotary piston engine having side air intake ports formed in the side housings and peripheral air intake port or ports formed in the rotor housing, said side air intake ports being closed during light load or low speed operation of the engine while the peripheral air intake ports are still open, the peripheral ports having an effective passage area which is small in relation to that of the side ports and also having a substantially smaller distance in the peripheral direction of the rotor housing than in the widthwise direction.

3 Claims, 4 Drawing Figures

FIG.1
FIG.3
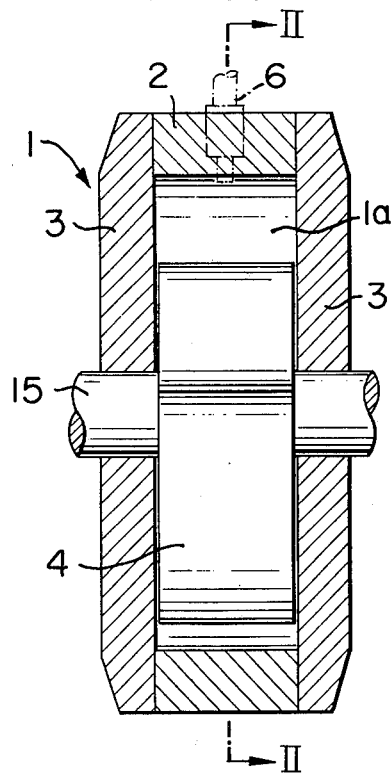
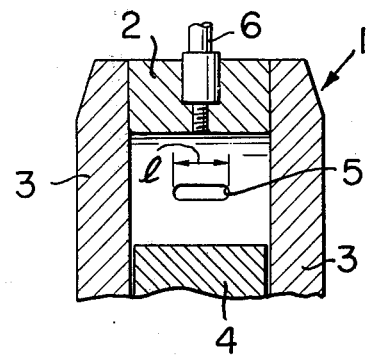
FIG.2
FIG.4
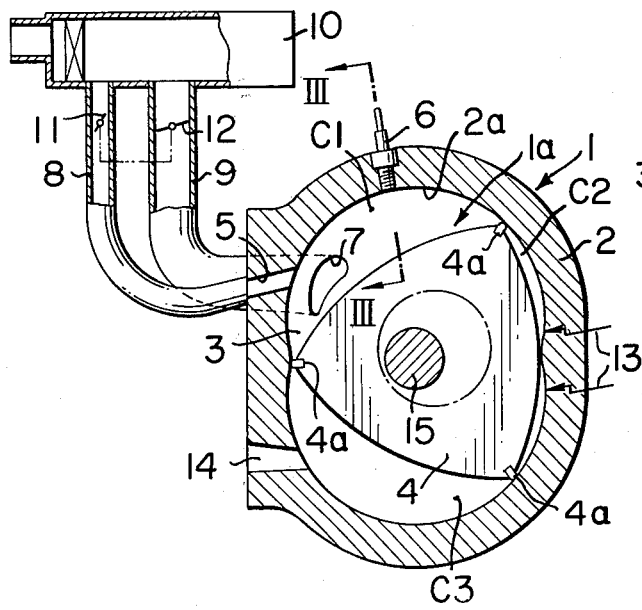
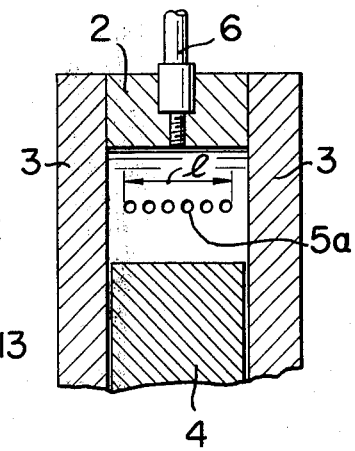

FUEL INJECTION TYPE ROTARY PISTON ENGINE

The present invention relates to a rotary piston type internal combustion engine, and more particularly to a rotary piston type engine of such a type that includes a casing which comprises a rotor housing having a trochoidal inner wall surface and a pair of side housings secured to the opposite sides of the rotor housing, and a substantially polygonal rotor disposed in said casing for revolution and rotation with apices thereof in sliding contact with the trochoidal inner wall so as to define working chambers in the casing. More particularly, the present invention relates to an improvement in the invention disclosed in the copending application Ser. No. 463,830 assigned to the same assignee of this application.

It has already been proposed in this field of art to provide a fuel injection type rotary piston engine having air intake port means formed in one of the side housings and auxiliary air intake port means formed in the rotor housing. In the known arrangement, air is taken into the working chamber through both of the air intake port means throughout the engine operation. Therefore, during light load or low speed operation of the engine, fresh air taken into the working chamber is made turbulent so that it becomes very difficult to obtain fuel-air mixture of stratified condition.

In order to eliminate the above problem, the applicant proposed in the aforementioned copending application to provide means for closing the air intake port means in the side housing during light load operation of engine while the air intake port means in the rotor housing is still open.

The present invention has an object to improve the fuel injection type rotary piston engine as proposed by the copending application Ser. No. 463,830 so that an improved atomization of fuel can be obtained and that air polluting constituent in engine exhaust gas can be substantially reduced.

Another object of the present invention is to provide a fuel injection type rotary piston engine in which fuel-air mixture of stratified condition can readily be formed in the working chamber during light load or low speed operation of the engine.

Thus, according to the present invention, there is provided a fuel injection type rotary piston engine including a rotor casing which comprises a rotor housing having a trochoidal inner wall and a pair of side housings secured to the opposite sides of the rotor housing to define a rotor chamber therein, a substantially polygonal rotor disposed in said rotor chamber for revolution and rotation therein with apices thereof in sliding contact with said trochoidal inner wall of the rotor housing so as to define working chambers between the casing and the rotor, first air intake port means formed in at least one of said side housings so as to open into the rotor chamber, first air intake passage means communicating with said first air intake port means and having first throttle valve means disposed therein, second air intake port means formed in said rotor housing so as to open into the rotor chamber, second air intake passage means communicating with said second air intake port means and having second throttle valve means disposed therein, means for closing said first throttle valve means in said first air intake passage means during light load operation of the engine while the second throttle valve of said second air intake passage means is still open, and fuel injection means for injecting fuel into one of the working chambers into which fresh air is introduced so that the injected fuel intersects the air flow from the second air port means, said second air intake port means having substantially smaller distance in the peripheral direction of the rotor housing than in the widthwise direction, the ratio of the effective passage area of the second air intake port means to that of the first air intake port means being between 1 to 3 and 1 to 9, whereby the air flow stream from the second air port means has a greater width than the injected fuel flow at the point of intersection.

The above and other objects and features of the present invention will become apparent from the following descriptions of preferred embodiments taking reference to the accompanying drawings, in which:

FIG. 1 is a sectional view of a rotary piston engine in accordance with one embodiment of the present invention;

FIG. 2 is a sectional view taken substantially along the line II—II in FIG. 1;

FIG. 3 is a fragmentary sectional view taken substantially along the line III—III in FIG. 2; and FIG. 4 is a sectional view similar to FIG. 3 but showing another embodiment of the present invention.

Referring now to the drawings, particularly to FIGS. 1 and 2, there is shown a rotary piston type engine including a casing 1 which comprises a rotor housing 2 having a trochoidal inner wall 2a, and a pair of side housings 3 secured to the opposite sides of the rotor housing 2 so as to define a rotor chamber 1a in the casing 1. A substantially triangular rotor 4 is disposed in the rotor chamber 1a and has apex seals 4a provided on the apices thereof for slidable sealing contact with the inner wall 2a of the rotor housing 2 so as to define working chambers C1, C2 and C3 in the casing 1, of which volumes are continuously changed as the rotor 4 rotates. In the position of the rotor 4 as illustrated in FIG. 2, the working chamber C1 is in the intake stroke, the chamber C2 in the compression stroke and the chamber C3 in the expansion and exhaust stroke.

The rotor housing 2 of the casing 1 is formed with a peripheral air intake port 5 opening into the rotor chamber 1a at the working chamber $C_1$ which is in the intake stroke. Further, the rotor housing 2 is provided with a fuel injection nozzle 6 for injecting fuel into the working chamber $C_1$. At least one of the side housings 3 is provided with a side air intake port 7 opening to the rotor chamber 1a at the working chamber $C_1$ which is in the intake stroke. The intake ports 5 and 7 respectively communicate with intake passages 8 and 9 which extend between an air cleaner 10 and the intake ports 5 and 7. The passages 8 and 9 are provided with throttle valves 11 and 12, respectively, which are simultaneously actuated by suitable means (not shown) well known in the art.

The peripheral intake port 5 has an effective passage area which is small in relation to that of the side intake port 7 or the ports 7 when they are formed in both of the side housings 3. According to the feature of the present invention, the ratio of the effective passage area of the port 5 to that of the port 7 is between 1 to 3 and 1 to 9. The term "effective passage area" as used herein will mean the minimum passage area of the whole passage including the intake port itself and the intake passage portion. The throttle valves 11 and 12 are interconnected with each other and, as shown in FIG. 2, the throttle valve 11 remains slightly open when the throttle valve 12 is completely closed. Further, as shown in FIG. 3, the peripheral intake port 5 is in the form of an elongated slot extending in the widthwise direction of the rotor housing 2 and having a length $l$.

The rotor housing 2 is also provided with ignition plugs as schematically shown by 13 and also with an exhaust port 14. The reference numeral 15 designates an output shaft of the engine.

During light load or low speed operation of the engine, the throttle valve 12 is closed while the throttle valve 11 remains slightly open as shown in FIG. 2 so that fresh air is taken only through the intake passage 8 and the peripheral intake port 5 into the working chamber C1 which is in the intake stroke. Since the peripheral intake port 5 has a reduced effective passage area as previously described, a stable intake air flow of substantial speed can be assured in the working chamber C1. At a suitable period of operation cycle, fuel is injected through the nozzle 6 in such a direction that the injected fuel flow intersects the intake air flow introduced from the peripheral port 5 into the working chamber C1 whereby the fuel is atomized and mixed with the air to form a fuel-air mixture. Since the intake air is introduced into the working chamber $C_1$ with a substantial flow speed, it is possible to form relatively rich mixture at a portion of the working chamber and relatively lean mixture and/or air at the remaining portion of the chamber. Thus, it is possible to make the mixture in the working chamber into a stratified condition, and the mixture is ignited by the ignition plugs 13 at the rich portion thereof. Since the peripheral intake port is of a reduced area, it is possible to decrease the overlap period, so that possibility of intake air being diluted by combustion gas can be substantially decreased. Further, since the peripheral port 5 is in the form of an elongated slot, the intake air flow from the port 5 has a width greater than that of the injected fuel at the point of intersection between the injected fuel and the intake air flow from the port 5. This is further effective to improve atomization of fuel and obtain air-fuel mixture of stratified condition. It should also be noted that the feature is effective to prevent fuel droplets from depositing on the inner walls of the side housings.

In the illustrated structure, the peripheral air intake port 5 is constituted by a single port opening, however, it should be noted that the port may be devided into a plurality of small holes as shown by 5a in FIG. 4.

Under a high speed and high load operation of engine, the throttle valve 12 is opened and air is allowed to flow through the intake passage 9 into the working chamber $C_1$. Thus, increased amount of air is supplied to the working chamber $C_1$ to provide an increased engine output.

The invention has thus been shown and described with respect to preferred embodiments, however, it should be noted that the invention is in no way limited to the details of the illustrated structure but changes and modifications may be made without departing from the scope of the appended claims.

We claim:

1. Fuel injection type rotary piston engine including a rotor casing which comprises a rotor housing having a trochoidal inner wall and a pair of side housings secured to the opposite sides of the rotor housing to define a rotor chamber therein, a substantially polygonal rotor disposed in said rotor chamber for revolution and rotation therein with apices thereof in sliding contact with said trochoidal inner wall of the rotor housing so as to define working chambers between the casing and the rotor, exhaust means communicating with one of said working chamber at a time for removing fluid therefrom, first air intake port means formed in at least one of said side housings so as to open into the rotor chamber, first air intake passage means communicating with said first air intake port means and having first throttle valve means disposed therein, second air intake port means formed in said rotor housing so as to open into the rotor chamber, second air intake passage means communicating with said second air intake port means and having second throttle valve means disposed therein, means for closing said first throttle valve means in said first air intake passage means during light load operation of the engine while the second throttle valve of said second air intake passage means is still open, and fuel injection means for injecting fuel into one of the working chambers into which fresh air is introduced so that the injected fuel intersects the air flow from the second air port means, said second air intake port means having substantially smaller distance in the peripheral direction of the rotor housing than in the widthwise direction, the ratio of the effective passage area of the second air intake port means to that of the first air intake port means being between 1 to 3 and 1 to 9, whereby the air flow stream from the second air port means has a greater width than the injected fuel flow at the point of intersection.

2. Rotary piston engine in accordance with claim 1 in which said second air intake port means comprises a single intake port in the form of an elongated slot.

3. Rotary piston engine in accordance with claim 1 in which said second air intake port means comprises a plurality of small holes arranged in at least one row extending in the widthwise direction of the rotor housing.

* * * * *